United States Patent [19]

Burke et al.

[11] 3,882,483

[45] May 6, 1975

[54] CODE CONVERTER SYSTEM AND METHOD

[75] Inventors: Edmund T. Burke, West Long Beach; Donald F. Kennedy, South Toms River, both of N.J.

[73] Assignee: Electronic Associates, Inc., West Long Branch, N.J.

[22] Filed: May 7, 1973

[21] Appl. No.: 357,624

[52] U.S. Cl. .......................... 340/347 DD; 235/155

[51] Int. Cl. .......................................... H03k 13/24

[58] Field of Search............... 235/155; 340/347 DD

[56] References Cited

UNITED STATES PATENTS

| | | | |
|---|---|---|---|
| 3,032,266 | 5/1962 | Couleur | 235/155 |
| 3,652,840 | 3/1972 | Lanning | 235/155 |
| 3,652,841 | 3/1972 | Lanning | 235/155 |
| 3,700,872 | 10/1972 | May | 235/155 |

*Primary Examiner*—Malcolm A. Morrison
*Assistant Examiner*—Vincent J. Sunderdick

[57] ABSTRACT

A system and method for converting binary coded decimal numbers to binary and for converting binary to binary coded decimal. Read only memories include a programmed mapping between the binary and binary coded decimal codes. Input to the read only memory in one code is converted to an output in the other code. The outputs from the read only memories are summed to produce the desired result.

1 Claim, 3 Drawing Figures

PATENTED MAY 6 1975 3,882,483

SHEET 2

CODE CONVERTER SYSTEM AND METHOD

BACKGROUND OF THE INVENTION

A. Field of the Invention

This invention pertains to the field of systems and methods for converting a digital signal in one code to an output signal in another code.

B. Prior Art

Systems and methods for converting between binary and binary coded decimal are known in the art. One type of prior technique is that of the denominated counter. In such systems, a binary counter contains the number to be converted. The number of pulses required for a countdown to zero is counted by a binary coded decimal counter resulting in a binary coded decimal equivalent of the binary number. However, such conversion systems are extremely slow.

Another prior technique utilized in the art is a denominated Couleur's technique. This is a serial approach to the code conversion process, thus resulting in a comparatively slow running time. In order to fabricate a parallel converter, complex additional circuitry is required for fast, efficient operation. However, even after being modified, the efficiency of this approach breaks down for binary words of length greater than seven bits.

Other methods of code conversion such as, (1) divide by 10 (where successive division by 10 converts binary images into BCD) and (2) multiply by 10 (with each product generating a BCD digit), are known in the art. However, such conversion systems and methods produce slow running times.

Other prior art utilize parallel conversion methods which are based upon logic elements operating on all bits of a word to be converted simultaneously. In some of these systems read only memory units are employed. However, in such units, where a negative number is entered, it is initially one complemented. Then while it is still a binary number (assuming a conversion from binary to BCD), a least significant bit is added to form the two's complement is manipulated in the conversion. Thus the ripple through time for a negative number would exceed that of a positive number. This provides for longer running time in the conversion technique than that which would be seen if both negative and positive numbers were treated in the same way.

SUMMARY OF THE INVENTION

A system for converting digital input signals to digital output signals between binary coded decimal and binary code signals. The system includes hard wired logic circuits having a programmed mapping between the codes. The logic circuits have input signals applied in one of the codes and produce a signal in the other code. Summing units connected to the logic circuits, sum the signals from the logic circuits for producing the digital output signal in one of the codes.

DESCRIPTION OF THE PREFERRED EMBODIMENT

Figure 1:
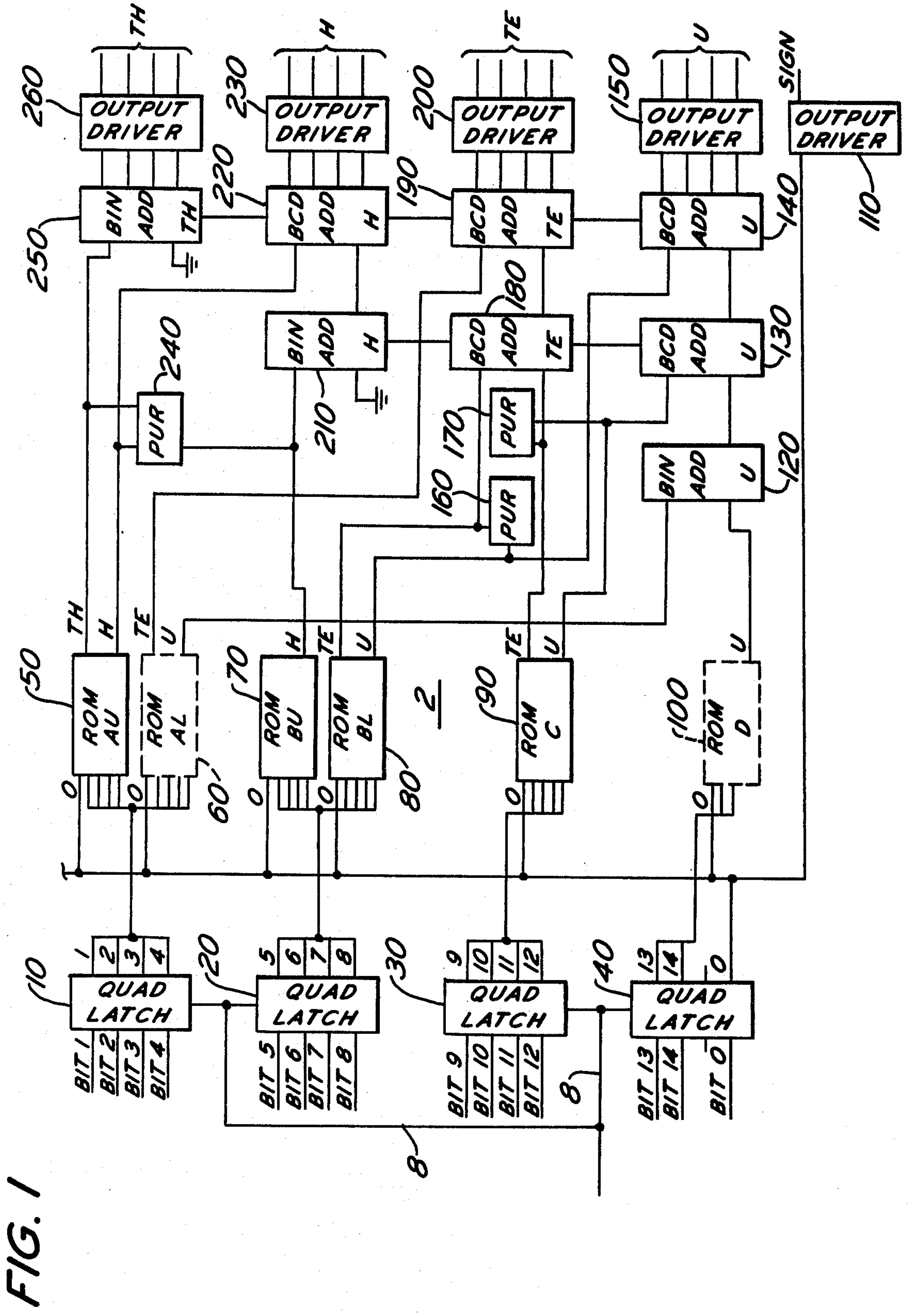
FIG. 1 is a functional schematic block diagram of the binary to binary coded decimal converter.
Figure 2:
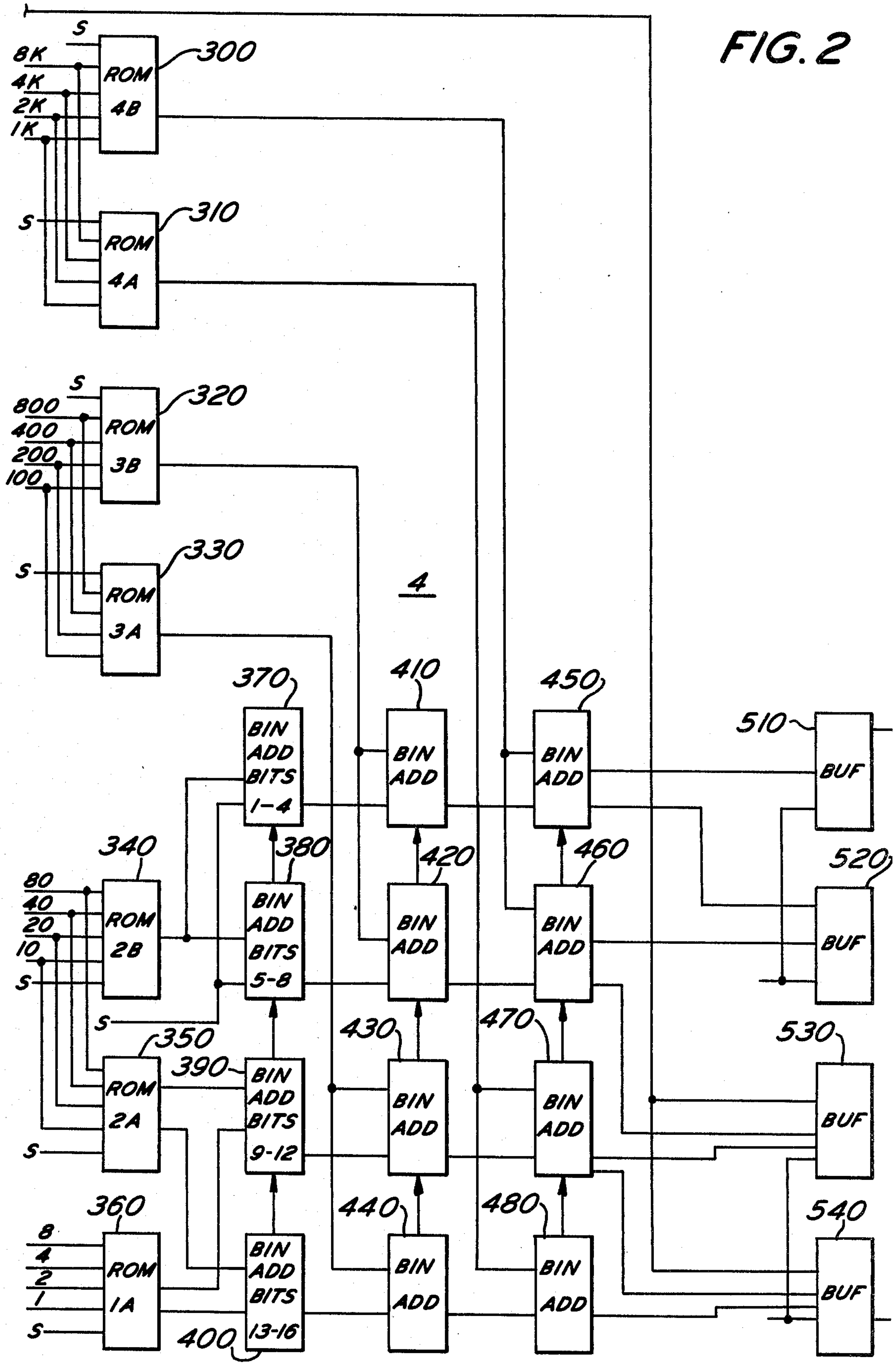
FIG. 2 is a functional schematic block diagram of the binary coded decimal to binary converter; and, FIG. 3 is a block diagram showing bit information placed in read only memory addresses.

Referring now to the invention, FIGS. 1 and 2 there are shown the functional block diagrams for a system for converting digital input signals to digital output signals between binary coded decimal and binary code signals. Conversion system 2, shown in FIG. 1 is used for converting binary to binary coded decimal signals. Conversion system 4, shown in FIG. 2 is used for converting binary coded decimal signals to binary. Number converters 2 and 4 basically use the same principles of operation to convert the signals between binary and binary coded decimal (BCD). In general, an input number is applied to converters 2 and 4 in one of the codes. The input number is broken apart into separate decades of information. Specific portions of the input number are used as address lines for read only memory elements. The read only memory units convert from one code to another and the outputs are then summed together and passed through an output driver stage.

Figure 3:
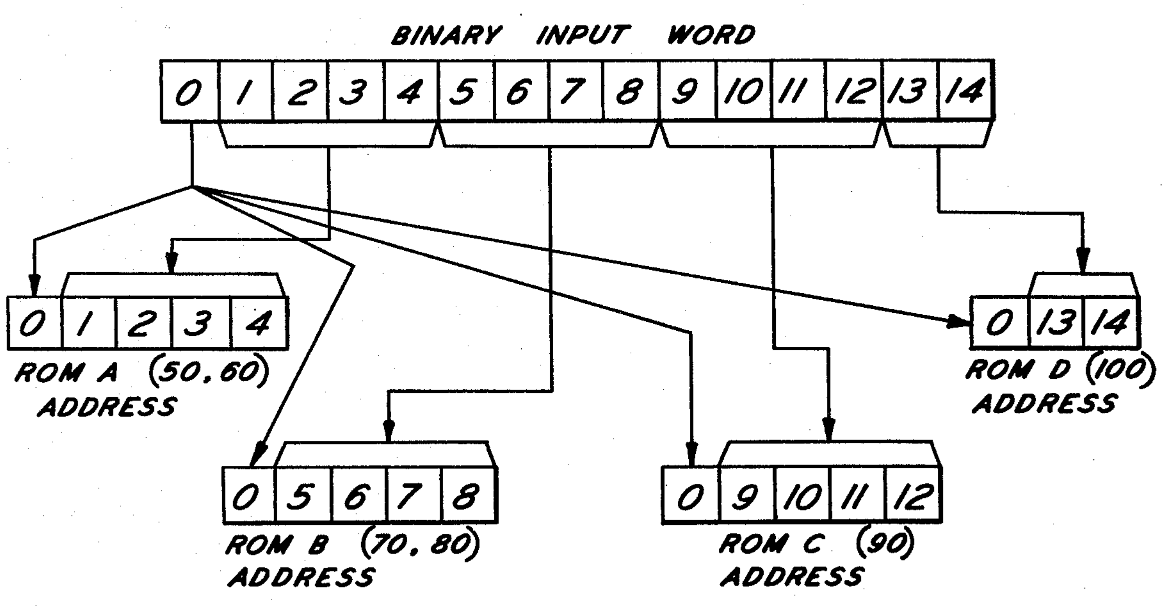

Binary to BCD converter 2, is shown in FIG. 1, where a binary number is inserted to quad latch mechanisms 10, 20, 30 and 40 through input line 8. Converter 2 is a ripple through parallel hardware number converter, which accepts a 14 bit plus sign fractional binary number input and produces a four BCD digit plus a sign output. Quad latch mechanisms 10, 20, 30 and 40 are standard elements utilized as input registers having an EAI (Electronic Associates, Inc.) part number 592.0168-0. The inputs to these elements are labeled bits 0 through 14. Bit 0 is the sign bit and is entered through quad latch 40. The binary input word is shown in FIG. 3.

The output of quad latch 10 are bits 1, 2, 3 and 4 which are applied to read only memories 50 and 60 (ROM AU and ROM AL). Additionally, sign bit 0 is applied to ROM AU and ROM AL 50, 60 through quad latch 40. Similarly, bits 0, 5, 6, 7 and 8 are applied to ROM's BU and BL, 70, 80 from quad latch mechanisms 20 and 40. Bits 0, 9, 10, 11 and 12 are applied to ROM C, 90 and finally bits 0, 13, 14 to ROM D, 100 as is shown.

The address lines for the bit signals applied to elements 50, 60, 70, 80, 90 and 100 are in binary so the address in binary. Each of the ROM's is hardwired programmed in accordance with the following mapping in the truth table listed below. The outputs of these ROM's are in decimal. The ROM elements shown in both FIGS. 1 and 2 are manufactured by Intersil Corp., Cupertino, Calif. having an Intersil part number IM5600 defining a blank programmable ROM in which the appropriate data is stored as is shown in the truth tables.

TRUTH TABLE

BIN TO BCD CONVERTER 2

| 50,60 ROM A ADR 01234 | ROM A OUTPUT U L | 70,80 ROM B ADR 05678 | ROM B OUTPUT U L | 90 ROM C ADR 0 9 10 11 12 | ROM C OUTPUT U L | 100 ROM D ADR 0 13 14 | ROM D OUTPUT U L |
|---|---|---|---|---|---|---|---|
| 00000 | 00 00 | 00000 | 00 00 | 0 0 0 0 0 | 00 00 | 0 0 0 | 00 00 |
| 00001 | 06 25 | 00001 | 00 39 | 0 0 0 0 1 | 00 02 | 0 0 1 | 00 01 |
| 00010 | 12 50 | 00010 | 00 78 | 0 0 0 1 0 | 00 05 | 0 1 0 | 00 01 |

TRUTH TABLE—Continued

| BIN TO BCD CONVERTER 2 | | | | | | | |
|---|---|---|---|---|---|---|---|
| 50,60 ROM A | | 70,80 ROM B | | 90 ROM C | | 100 ROM D | |
| ADR 01234 | OUTPUT U L | ADR 05678 | OUTPUT U L | ADR 0 9 10 11 12 | OUTPUT U L | ADR 0 13 14 | OUTPUT U L |
| 00011 | 18 75 | 00011 | 01 17 | 0 0 0 1 1 | 00 07 | 0 1 1 | 00 02 |
| 00100 | 25 00 | 00100 | 01 56 | 0 0 1 0 0 | 00 10 | 1 0 0 | 00 02 |
| 00101 | 31 25 | 00101 | 01 95 | 0 0 1 0 1 | 00 12 | 1 0 1 | 00 02 |
| 00110 | 37 50 | 00110 | 02 34 | 0 0 1 1 0 | 00 15 | 1 1 0 | 00 01 |
| 00111 | 43 75 | 00111 | 02 73 | 0 0 1 1 1 | 00 17 | 1 1 1 | 00 01 |
| 01000 | 50 00 | 01000 | 03 12 | 0 1 0 0 0 | 00 20 | | |
| 01001 | 56 25 | 01001 | 03 52 | 0 1 0 0 1 | 00 22 | | |
| 01010 | 62 50 | 01010 | 03 91 | 0 1 0 1 0 | 00 24 | | |
| 01011 | 68 75 | 01011 | 04 30 | 0 1 0 1 1 | 00 27 | | |
| 01100 | 75 00 | 01100 | 04 69 | 0 1 1 0 0 | 00 29 | | |
| 01101 | 81 25 | 01101 | 05 08 | 0 1 1 0 1 | 00 32 | | |
| 01110 | 87 50 | 01110 | 05 47 | 0 1 1 1 0 | 00 34 | | |
| 01111 | 93 75 | 01111 | 05 86 | 0 1 1 1 1 | 00 37 | | |
| 10000 | 93 75 | 10000 | 05 86 | 1 0 0 0 0 | 00 37 | | |
| 10001 | 87 50 | 10001 | 05 47 | 1 0 0 0 1 | 00 34 | | |
| 10010 | 81 25 | 10010 | 05 08 | 1 0 0 1 0 | 00 32 | | |
| 10011 | 75 00 | 10011 | 04 69 | 1 0 0 1 1 | 00 29 | | |
| 10100 | 68 75 | 10100 | 04 30 | 1 0 1 0 0 | 00 27 | | |
| 10101 | 62 50 | 10101 | 03 91 | 1 0 1 0 1 | 00 24 | | |
| 10110 | 56 25 | 10110 | 03 52 | 1 0 1 1 0 | 00 22 | | |
| 10111 | 50 00 | 10111 | 03 12 | 1 0 1 1 1 | 00 20 | | |
| 11000 | 43 75 | 11000 | 02 73 | 1 1 0 0 0 | 00 17 | | |
| 11001 | 37 50 | 11001 | 02 34 | 1 1 0 0 1 | 00 15 | | |
| 11010 | 31 25 | 11010 | 01 95 | 1 1 0 1 0 | 00 12 | | |
| 11011 | 25 00 | 11011 | 01 56 | 1 1 0 1 1 | 00 10 | | |
| 11100 | 18 75 | 11100 | 01 17 | 1 1 1 0 0 | 00 07 | | |
| 11101 | 12 50 | 11101 | 00 78 | 1 1 1 0 1 | 00 05 | | |
| 11110 | 06 25 | 11110 | 00 39 | 1 1 1 1 0 | 00 02 | | |
| 11111 | 00 00 | 11111 | 00 00 | 1 1 1 1 1 | 00 00 | | |

It should be noted, that ROM AL, 60 provides an output of 00, 25, 50, or 75 depending on the value of the input bits 0, 3, 4. It is therefore to be understood that ROM AL, 60 may be eliminated and combinational logic inserted in its place. Each of elements 50, 60, 70, 80, 90 and 100 have output lines labeled TH (thousands), H (hundreds), TE (tens) and U (units) representing those portions of the contribution to the output from the associated incoming ROM bits.

On the outputs of elements 50, 60, 70, 80 and 90 are pull up resister elements (PUR) 160, 170 and 240. Although not critical to the inventive concept, these resister elements provide collector loads for the output.

Units output from elements 60 and 100 are summed together in binary adder 120. The output of adder 120 is applied to BCD adder 130 and summed with the units from ROM C, 90. The output of BCD adder 130 is then applied to BCD adder 140 where it is summed with the units portion output from ROM BL 80.

The tens output from ROM C, 90, and ROM BL, 80 are added together in BCD adder 180. The output of adder 180 is fed directly into adder element 190, where it is summed together with the tens output portion of ROM AL, 60 (or combinational logic element). Similarly, the hundreds portion of the data is taken from ROM elements 50, and 70 and added together in Binary adder 210 and BCD adder 220 as is shown in FIG. 1. The thousands portion of output data from element 50 is inserted into binary adder 250.

Adders 120, 210 and 250 are binary adders, such were used where the output would not exceed the capability of a binary adder. Where the capability might be exceeded, BCD adders were used. The binary adders, as well as the BCD adders used are well known in the art. The binary adders used are produced by Texas Instruments Inc. (TII) having part number Ser. No. 7,483 and are standard TII adder packs. The BCD adders are also standard and made up of a combination of two TII Ser. No. 7,483 elements to give the desired output range.

In general as has been described, fractional outputs have been taken from ROM elements 50, 60, 70, 80, 90 and 100 and summed together to achieve an output BCD number from elements 140, 190, 220 and 250. The thousands digit is read from adder 250, the hundreds digit from adder 220, the tens digit from element 190 and the units digit from adder 140. The resulting numbers are then fed into standard output drivers 150, 200, 230 and 260 as shown in FIG. 1. The sign bit (bit 0) is carried from quad latch 40 to output driver 110 and is presented to the output to drive the sign of an indicator.

In the truth table (BIN to BCD Converter) the first sixteen binary entries for ROM's 50, 60, 70, 80 and 90 as well as the first four entries for ROM 100 represent positive number input. When a number is negative, the second half of the table entries are accessed. When a negative number is used, what is being converted is a one's complement number. In actual fact, a two's complement number is desired for the negative number. From the truth table, it is seen that the negative number is treated as a one's complement up to the input of each ROM element. On the negative portion of the table, a least significant binary bit is added in the digital or decimal domain. Thus the correction is made directly in the table entry.

Binary coded decimal (BCD) to Binary (BIN) converter 4, is shown in FIG. 2 and operates on the same basic principles provided for converter 2. Conversion from BCD to BIN is made within ROM elements 300, 310, 320, 330, 340, 350 and 360 which are standard TTL integrated circuit read only memories manufactured by Intersil Corp. having an EAI part No. 592.0279-0. In ROM's 300 and 310, the input applied is the thousands portion of the BCD number which is being converted. Five address lines are connected to ROM's 300, 310 representing 8000, 4000, 2000, 1000 and the sign bit. Elements 320, 330 accept the hundreds portion of the BCD number, elements 340 and 350 accept the tens portion and finally element 360 accepts the units portion of the number. Note that element 340 may either be a ROM element or a logic block for conversion. Each logic element is hard wired programmed to produce binary datum. In order to provide the appropriate conversion, elements 300, 310, 320, 330, 340, 350 and 360 are programmed in accordance with the following truth tables:

TRUTH TABLE

BCD TO BIN CONVERTER 4

| THOUSANDS ROM's 300,310 ADDR. 8 4 2 1 SIGN K K K K | OUT IN HEX UPPER | LOWER | HUNDREDS ROM's 320,330 ADDR. 8 4 2 1 SIGN H H H H | OUT IN HEX UPPER | LOWER |
|---|---|---|---|---|---|
| 0 0 0 0 0 | 0-0 | 0-0 | 0 0 0 0 0 | 0-0 | 0-0 |
| 0 0 0 0 1 | 1-9 | 9-10 | 0 0 0 0 1 | 0-2 | 8-15 |
| 0 0 0 1 0 | 3-3 | 3-3 | 0 0 0 1 0 | 0-5 | 1-15 |
| 0 0 0 1 1 | 4-12 | 12-13 | 0 0 0 1 1 | 0-7 | 10-14 |
| 0 0 1 0 0 | 6-6 | 6-6 | 0 0 1 0 0 | 0-10 | 3-13 |
| 0 0 1 0 1 | 8-0 | 0-0 | 0 0 1 0 1 | 0-12 | 12-13 |
| 0 0 1 1 0 | 9-9 | 9-10 | 0 0 1 1 0 | 0-15 | 5-12 |
| 0 0 1 1 1 | 11-13 | 3-3 | 0 0 1 1 1 | 1-1 | 14-12 |
| 0 1 0 0 0 | 12-12 | 12-13 | 0 1 0 0 0 | 1-4 | 7-11 |
| 0 1 0 0 1 | 14-6 | 6-6 | 0 1 0 0 1 | 1-7 | 0-10 |
| 0 1 0 1 0 | 0-0 | 0-0 | 0 1 0 1 0 | 0-0 | 0-0 |
| 0 1 0 1 1 | 0-0 | 0-0 | 0 1 0 1 1 | 0-0 | 0-0 |
| 0 1 1 0 0 | 0-0 | 0-0 | 0 1 1 0 0 | 0-0 | 0-0 |
| 0 1 1 0 1 | 0-0 | 0-0 | 0 1 1 0 1 | 0-0 | 0-0 |
| 0 1 1 1 0 | 0-0 | 0-0 | 0 1 1 1 0 | 0-0 | 0-0 |
| 0 1 1 1 1 | 0-0 | 0-0 | 0 1 1 1 1 | 0-0 | 0-0 |
| 1 0 0 0 0 | 0-0 | 0-0 | 1 0 0 0 0 | 0-0 | 0-0 |
| 1 0 0 0 1 | 14-6 | 6-6 | 1 0 0 0 1 | 15-13 | 7-1 |
| 1 0 0 1 0 | 12-12 | 12-13 | 1 0 0 1 0 | 15-10 | 14-1 |
| 1 0 0 1 1 | 11-3 | 3-3 | 1 0 0 1 1 | 15-8 | 5-2 |
| 1 0 1 0 0 | 9-9 | 9-10 | 1 0 1 0 0 | 15-5 | 12-3 |
| 1 0 1 0 1 | 8-0 | 0-0 | 1 0 1 0 1 | 15-3 | 3-3 |
| 1 0 1 1 0 | 6-6 | 6-6 | 1 0 1 1 0 | 15-0 | 10-4 |
| 1 0 1 1 1 | 4-12 | 12-13 | 1 0 1 1 1 | 14-14 | 1-4 |
| 1 1 0 0 0 | 3-3 | 3-3 | 1 1 0 0 0 | 14-11 | 8-5 |
| 1 1 0 0 1 | 1-9 | 9-10 | 1 1 0 0 1 | 14-8 | 15-6 |
| 1 1 0 1 0 | 0-0 | 0-0 | 1 1 0 1 0 | 0-0 | 0-0 |
| 1 1 0 1 1 | 0-0 | 0-0 | 1 1 0 1 1 | 0-0 | 0-0 |
| 1 1 1 0 0 | 0-0 | 0-0 | 1 1 1 0 0 | 0-0 | 0-0 |
| 1 1 1 0 1 | 0-0 | 0-0 | 1 1 1 0 1 | 0-0 | 0-0 |
| 1 1 1 1 0 | 0-0 | 0-0 | 1 1 1 1 0 | 0-0 | 0-0 |
| 1 1 1 1 1 | 0-0 | 0-0 | 1 1 1 1 1 | 0-0 | 0-0 |

| TENS ROM's 340,350 ADDR. 8 4 2 1 SIGN T T T T | OUT IN HEX UPPER | LOWER | UNITS ROM's 360 ADDR. 8 4 2 1 SIGN U U U U | OUT IN HEX UPPER | LOWER |
|---|---|---|---|---|---|
| 0 0 0 0 0 | 0-0 | 0-0 | 0 0 0 0 0 | 0-0 | 0-0 |
| 0 0 0 0 1 | 0-0 | 4-2 | 0 0 0 0 1 | 0-0 | 0-7 |
| 0 0 0 1 0 | 0-0 | 8-3 | 0 0 0 1 0 | 0-0 | 0-13 |
| 0 0 0 1 1 | 0-0 | 12-5 | 0 0 0 1 1 | 0-0 | 1-4 |
| 0 0 1 0 0 | 0-1 | 0-6 | 0 0 1 0 0 | 0-0 | 1-10 |
| 0 0 1 0 1 | 0-1 | 4-8 | 0 0 1 0 1 | 0-0 | 2-1 |
| 0 0 1 1 0 | 0-1 | 8-9 | 0 0 1 1 0 | 0-0 | 2-7 |
| 0 0 1 1 1 | 0-11 | 12-11 | 0 0 1 1 1 | 0-0 | 2-14 |
| 0 1 0 0 0 | 0-2 | 0-12 | 0 1 0 0 0 | 0-0 | 3-4 |
| 0 1 0 0 1 | 0-2 | 4-14 | 0 1 0 0 1 | 0-0 | 3-11 |
| 0 1 0 1 0 | 0-0 | 0-0 | 0 1 0 1 0 | 0-0 | 0-0 |
| 0 1 0 1 1 | 0-0 | 0-0 | 0 1 0 1 1 | 0-0 | 0-0 |
| 0 1 1 0 0 | 0-0 | 0-0 | 0 1 1 0 0 | 0-0 | 0-0 |
| 0 1 1 0 1 | 0-0 | 0-0 | 0 1 1 0 1 | 0-0 | 0-0 |
| 0 1 1 1 0 | 0-0 | 0-0 | 0 1 1 1 0 | 0-0 | 0-0 |
| 0 1 1 1 1 | 0-0 | 0-0 | 0 1 1 1 1 | 0-0 | 0-0 |
| 1 0 0 0 0 | 0-0 | 0-0 | 1 0 0 0 0 | 0-0 | 0-0 |
| 1 0 0 0 1 | 15-15 | 11-14 | 1 0 0 0 1 | 15-15 | 15-9 |
| 1 0 0 1 0 | 15-15 | 7-13 | 1 0 0 1 0 | 15-15 | 15-3 |
| 1 0 0 1 1 | 15-15 | 3-11 | 1 0 0 1 1 | 15-15 | 14-12 |
| 1 0 1 0 0 | 15-14 | 15-10 | 1 0 1 0 0 | 15-15 | 14-6 |
| 1 0 1 0 1 | 15-14 | 11-8 | 1 0 1 0 1 | 15-15 | 13-15 |
| 1 0 1 1 0 | 15-14 | 7-7 | 1 0 1 1 0 | 15-15 | 13-9 |
| 1 0 1 1 1 | 15-14 | 3-5 | 1 0 1 1 1 | 15-15 | 13-2 |
| 1 1 0 0 0 | 15-13 | 15-4 | 1 1 0 0 0 | 15-15 | 12-12 |
| 1 1 0 0 1 | 15-13 | 11-2 | 1 1 0 0 1 | 15-15 | 12-5 |
| 1 1 0 1 0 | 0-0 | 0-0 | 1 1 0 1 0 | 0-0 | 0-0 |
| 1 1 0 1 1 | 0-0 | 0-0 | 1 1 0 1 1 | 0-0 | 0-0 |
| 1 1 1 0 0 | 0-0 | 0-0 | 1 1 1 0 0 | 0-0 | 0-0 |
| 1 1 1 0 1 | 0-0 | 0-0 | 1 1 1 0 1 | 0-0 | 0-0 |
| 1 1 1 1 0 | 0-0 | 0-0 | 1 1 1 1 0 | 0-0 | 0-0 |
| 1 1 1 1 1 | 0-0 | 0-0 | 1 1 1 1 1 | 0-0 | 0-0 |

The binary output of the hard wired logic elements are summed together in adder packs 370 through 480 as shown in FIG. 2. The adder packs are standard binary adders, one type which was used being manufactured by Texas Instruments Inc. having a part number Ser. No. 7,483.

As an example to show the flow of information, the least significant four bits from element 360 and 350 are summed together in adder pack 400. This summation is applied to adder pack 440 where it is added to the least significant four bits from element 330. The total from summer 440 is applied to adder 480 where it is summed with the least significant four bits from element 310. The output from adder 480 is then placed in buffer unit 540 prior to read out. Similarly, the next four bits are taken from elements 360 and 350, applied to adder 390 and pass through adder stages 430, 470 picking up information from elements 330 and 310 respectively to be added to the last adder pack total. The output is then placed in buffer unit 530. The next four bits pass from adders 380, applied to element 420, and adder 460 to be finally inserted into buffer unit 520. Summer packs 370, 410, and 450 operate on bits 1, 2, 3 and 4 in a manner similar to that described, and input such into buffer 510 prior to read out.

As an example assume that the number +0.9371 is to be converted from BCD to binary code. In BCD format, the coefficient of 0.9371 are represented by 01001, 00011, 00111, 00001. Where the most significant bit in each group of 5 represents the + sign, the least five bits are operated upon in ROM element 360. The decimal number is +0.0001 which has a fractional binary equivalent of 0000, 0000, 0000, 0111. The next five bits in BCD format are 00111 which represent the digit of the decimal number +0.007. These four bits are operated upon in ROM element 360. The resulting fractional binary equivalent is 0000, 0001, 1100, 1011. At this point two word segments in fractional binary have been formed and these word segments are arithmetically added together as has been described. The outputs of adder elements 370, 380, 390 and 400 now contain the fractional binary equivalent of 0.0071 which is 0000 0001 1101 0010.

The next BCD character 00011 is operated upon in ROM's 320 and 330. This corresponds to the decimal number +0.03 (of the original decimal number 0.9371). The +0.03 breaks down to the 16 bit fractional binary word 000 0111 1010 1110 which is added to the previous sum 0.0071 (0000 0001 1101 0010) in adders 410, 420, 430 and 440. At the output of these adders, the word appears as 0000 1001 1000 0000.

Finally, the BCD character 01001 (representing +0.9) is operated upon by ROM's 300 and 310. The fractional binary is 1110 0110 0110 0110. This output is added to the previous total in adder elements 450, 460, 470 and 480 to achieve the final result 1110 1111 1110 0110.

In general, as has been described, the code converter system permits utilization of an input as an address in the table lookup of a different number system. If the code conversion were done on a 1:1 basis, such a scheme would require on the order of 20,000 lookups. Similarly, where two tables are used, then 200 lookups are required. In the present system, four conversion tables are provided which require only 20 lookups. Thus, by dividing the code into word segments contained in individual tables, and adding different segments together, a capability of 20,000 lookups is achieved.

What is claimed is:

1. A system for converting digital input signals to digital output signals between binary coded decimal and binary code signals, comprising:

a. hard wired logic means having a programmed mapping between said codes, said logic means having said input signal applied in one of said codes and for producing a signal in the other of said codes, said logic means including a plurality of read only memory means connected each to the other in parallel fashion, each of said read only memory means having a predetermined decade of information applied thereto in said input signal code;

b. storage register means for holding predetermined decades of information signals, said storage register means applying said signals to said read only memory means, at least one of said storage register means applying an information signal to each of said read only memory means for determining the sign of a number being applied to said read only memory means in said input signal code; and c. summing means connected to said logic means for summing said signals from said logic means for producing said digital output signal in one of said codes.

* * * * *